(12) United States Patent
Zhong et al.

(10) Patent No.: US 10,860,539 B2
(45) Date of Patent: Dec. 8, 2020

(54) DE-DUPLICATION-BASED REMOTE REPLICATION METHOD, AND APPARATUS

(71) Applicant: Huawei Technologies Co., Ltd., Shenzhen (CN)

(72) Inventors: Yanhui Zhong, Chengdu (CN); Chengwei Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 883 days.

(21) Appl. No.: 15/486,536

(22) Filed: Apr. 13, 2017

(65) Prior Publication Data

US 2017/0235754 A1 Aug. 17, 2017

Related U.S. Application Data

(63) Continuation of application No. PCT/CN2015/089977, filed on Sep. 18, 2015.

(30) Foreign Application Priority Data

Dec. 31, 2014 (CN) .......................... 2014 1 0854706

(51) Int. Cl.
*G06F 16/174* (2019.01)
*G06F 16/14* (2019.01)
(Continued)

(52) U.S. Cl.
CPC .......... *G06F 16/1752* (2019.01); *G06F 3/067* (2013.01); *G06F 3/0613* (2013.01);
(Continued)

(58) Field of Classification Search
CPC .................................................. G06F 16/1752
See application file for complete search history.

(56) References Cited

U.S. PATENT DOCUMENTS 8,392,384 B1 * 3/2013 Wu ..................... G06F 16/1748
707/693
8,577,850 B1 11/2013 Genda et al.
(Continued)

FOREIGN PATENT DOCUMENTS

CN 102510340 A 6/2012
CN 102624871 A 8/2012
(Continued)

OTHER PUBLICATIONS

Machine Translation and Abstract of Chinese Publication No. CN102510340, Jun. 20, 2012, 7 pages.
(Continued)

*Primary Examiner* — Van H Oberly
(74) *Attorney, Agent, or Firm* — Conley Rose, P.C.

(57) ABSTRACT

A de-duplication-based remote replication method and an apparatus are provided in a system including a primary end device and a disaster recovery end device, and both the primary end device and the disaster recovery end device store a first snapshot; the primary end device obtains a second snapshot of the primary end device, and sends the first data block, the fingerprint of the first data block, and metadata of the added data blocks to the disaster recovery end device when a fingerprint of a first data block in the added data blocks is different from the fingerprints of the data blocks in the first snapshot.

20 Claims, 6 Drawing Sheets

(51) Int. Cl.
*G06F 16/11* (2019.01)
*G06F 16/182* (2019.01)
*G06F 3/06* (2006.01)
*G06F 11/14* (2006.01)

(52) U.S. Cl.
CPC ........ *G06F 3/0641* (2013.01); *G06F 11/1453* (2013.01); *G06F 16/128* (2019.01); *G06F 16/14* (2019.01); *G06F 16/1844* (2019.01)

(56) References Cited

U.S. PATENT DOCUMENTS

| | | | |
|---|---|---|---|
| 2002/0038296 A1* | 3/2002 | Margolus | ............. G06Q 20/206 |
| 2013/0212071 A1 | 8/2013 | Grondin et al. | |
| 2013/0212074 A1 | 8/2013 | Romanski et al. | |
| 2014/0101113 A1* | 4/2014 | Zhang | ................. G06F 11/1453 707/692 |

FOREIGN PATENT DOCUMENTS

| | | | |
|---|---|---|---|
| CN | 103870362 | A | 6/2014 |
| CN | 104484480 | A | 4/2015 |
| WO | 03092166 | A1 | 11/2003 |

OTHER PUBLICATIONS

Machine Translation and Abstract of Chinese Publication No. CN102624871, Aug. 1, 2012, 8 pages.
Machine Translation and Abstract of Chinese Publication No. CN103870362, Jun. 18, 2014, 24 pages.
Machine Translation and Abstract of Chinese Publication No. CN104484480, Apr. 1, 2015, 19 pages.
Foreign Communication From a Counterpart Application, Chinese Application No. 20140854706.4, Chinese Office Action dated Apr. 26, 2017, 7 pages.
Foreign Communication From a Counterpart Application, PCT Application No. PCT/CN2015/089977, English Translation of International Search Report dated Dec. 31, 2015, 2 pages.
Foreign Communication From a Counterpart Application, PCT Application No. PCT/CN2015/089977, English Translation of Written Opinion dated Dec. 31, 2015, 7 pages.
Foreign Communication From a Counterpart Application, European Application No. 15874905.1, Extended European Search Report dated Oct. 17, 2017, 14 pages.

* cited by examiner

DE-DUPLICATION-BASED REMOTE REPLICATION METHOD, AND APPARATUS

CROSS-REFERENCE TO RELATED APPLICATION

This application is a continuation of International Patent Application No. PCT/CN2015/089977, filed on Sep. 18, 2015, which claims priority to Chinese Patent Application No. 201410854706.4, filed on Dec. 31, 2014, both of which are hereby incorporated by reference in their entireties.

TECHNICAL FIELD

Embodiments of the present disclosure relate to the field of computer technologies, and in particular, to a de-duplication-based remote replication method and an apparatus.

BACKGROUND

De-duplication is a data reduction technology designed to reduce a storage capacity used in a storage system. Duplicate variable-sized data blocks in different locations in different data are searched for, and these duplicate data blocks are replaced with indicators, so as to reduce a stored data volume. A highly redundant data set (for example, backup data) benefits greatly from the de-duplication technology, and a user may implement a reduction ratio from 10:1 to 50:1. Remote replication is a disaster recovery technology, which refers to replicating data of a primary end device to a remote disaster recovery end device. When the data of the primary end device is corrupted, the data may be recovered using the disaster recovery end device.

When the de-duplication technology is applied to the remote replication, a data transmission volume may be reduced, consumption of bandwidth may be reduced, and a replication window may be reduced. In a typical de-duplication-based remote replication solution, a fingerprint of differentiated data between to-be-replicated data and last-replicated data of a primary end device is sent to a disaster recovery end device for querying; the disaster recovery end device loads the fingerprint to query whether the fingerprint of the differentiated data of the primary end device exists in the disaster recovery end device, and sends a fingerprint existing in the disaster recovery end device to the primary end device; when the fingerprint exists in the disaster recovery end device, it is considered that the differentiated data exists in the disaster recovery end device; when the fingerprint does not exist in the disaster recovery end device, it is considered that the differentiated data does not exist in the disaster recovery end device, and the primary end device needs to send the differentiated data to the disaster recovery end device.

However, a problem existing in the prior art is that a fingerprint query operation is extremely complex, and network interaction is increased because of a fingerprint query process, and consequently much network bandwidth is occupied.

SUMMARY

Embodiments of the present disclosure provide a de-duplication-based remote replication method and an apparatus, so as to overcome a prior-art problem that a fingerprint query operation is extremely complex, and network interaction is increased because of a fingerprint query process, and consequently much network bandwidth is occupied.

According to a first aspect, an embodiment of the present disclosure provides a de-duplication-based remote replication method applied to a remote replication system, where the system includes a primary end device and a disaster recovery end device, and both the primary end device and the disaster recovery end device store a first snapshot; and the method includes obtaining, by the primary end device, a second snapshot of the primary end device; determining, by the primary end device, whether fingerprints of data blocks added in the second snapshot compared with the first snapshot are the same as fingerprints of data blocks in the first snapshot; and sending the first data block, the fingerprint of the first data block, and metadata of the added data blocks to the disaster recovery end device when a fingerprint of a first data block in the added data blocks is different from the fingerprints of the data blocks in the first snapshot.

With reference to the first aspect, in a first possible implementation manner of the first aspect, determining, by the primary end device, whether fingerprints of data blocks added in the second snapshot compared with the first snapshot are the same as fingerprints of data blocks in the first snapshot includes obtaining, by the primary end device, a first transaction number of the first snapshot and a second transaction number of a fingerprint of each data block in the added data blocks; and determining whether the second transaction number is greater than the first transaction number, where the fingerprint of the first data block is different from the fingerprints of the data blocks in the first snapshot when a second transaction number of the fingerprint of the first data block is greater than the first transaction number, and fingerprints of data blocks excluding the first data block in the added data blocks are the same as the fingerprints of the data blocks in the first snapshot.

With reference to the first aspect, in a second possible implementation manner of the first aspect, determining, by the primary end device, whether fingerprints of data blocks added in the second snapshot compared with the first snapshot are the same as fingerprints of data blocks in the first snapshot includes obtaining, by the primary end device, a differentiated record, where the differentiated record is used to record the added data blocks; and determine, by the primary end device, whether the fingerprints of the added data blocks that are recorded in the differentiated record are the same as the fingerprints of the data blocks in the first snapshot.

With reference to any one of the first aspect, or the first or the second possible implementation manner of the first aspect, in a third possible implementation manner of the first aspect, the method further includes skipping replicating the first data block to the disaster recovery end device when the fingerprint of the first data block in the added data blocks is the same as the fingerprints of the data blocks in the first snapshot.

According to a second aspect, an embodiment of the present disclosure provides a de-duplication-based remote replication method applied to a remote replication system, where the system includes a primary end device and a disaster recovery end device, and both the primary end device and the disaster recovery end device store a first snapshot; and the method includes obtaining, by the primary end device, a second snapshot of the primary end device; obtaining, by the primary end device, a differentiated record, where the differentiated record is used to record data blocks added in the second snapshot compared with the first snapshot; obtaining, by the primary end device, fingerprints of the added data blocks; sending, by the primary end device, the fingerprints of the added data blocks to the disaster recovery end device, so that the disaster recovery end device determines whether the fingerprints of the added data blocks already exist in the disaster recovery end device; receiving, by the primary end device, duplicate check information that is sent by the disaster recovery end device, where the duplicate check information includes a fingerprint that is of a first data block in the added data blocks and that is different from fingerprints of data blocks in the first snapshot; and sending, by the primary end device according to the duplicate check information, the first data block indicated by the duplicate check information and metadata of the added data blocks to the disaster recovery end device.

With reference to the second aspect, in a first possible implementation manner of the second aspect, the obtaining, by the primary end device, fingerprints of the added data blocks includes obtaining, by the primary end device, the fingerprints of the added data blocks using a hardware accelerator card.

According to a third aspect, an embodiment of the present disclosure provides a primary end device, including a storage module configured to store a first snapshot, where the first snapshot is also stored in a disaster recovery end device; an obtaining module configured to obtain a second snapshot of the primary end device; a processing module configured to determine whether fingerprints of data blocks added in the second snapshot compared with the first snapshot are the same as fingerprints of data blocks in the first snapshot; and a sending module configured to send the first data block, the fingerprint of the first data block, and metadata of the added data blocks to the disaster recovery end device when a fingerprint of a first data block in the added data blocks is different from the fingerprints of the data blocks in the first snapshot.

With reference to the third aspect, in a first possible implementation manner of the third aspect, the processing module is configured to obtain a first transaction number of the first snapshot and a second transaction number of a fingerprint of each data block in the added data blocks; and determine whether the second transaction number is greater than the first transaction number, where the fingerprint of the first data block is different from the fingerprints of the data blocks in the first snapshot when a second transaction number of the fingerprint of the first data block is greater than the first transaction number, and fingerprints of data blocks excluding the first data block in the added data blocks are the same as the fingerprints of the data blocks in the first snapshot.

With reference to the third aspect, in a second possible implementation manner of the third aspect, the obtaining module is configured to obtain a differentiated record, where the differentiated record is used to record the added data blocks; and the processing module is configured to determine whether the fingerprints of the added data blocks that are recorded in the differentiated record are the same as the fingerprints of the data blocks in the first snapshot.

With reference to any one of the third aspect, or the first or the second possible implementation manner of the third aspect, in a third possible implementation manner of the third aspect, the processing module is further configured to skip replicating the first data block to the disaster recovery end device when the fingerprint of the first data block in the added data blocks is the same as the fingerprints of the data blocks in the first snapshot.

According to a fourth aspect, an embodiment of the present disclosure provides a primary end device, including a storage module configured to store a first snapshot, where the first snapshot is also stored in a disaster recovery end device; an obtaining module configured to obtain a second snapshot of the primary end device, where the obtaining module is further configured to obtain a differentiated record, where the differentiated record is used to record data blocks added in the second snapshot compared with the first snapshot; and the obtaining module is further configured to obtain fingerprints of the added data blocks; a sending module configured to send the fingerprints of the added data blocks to the disaster recovery end device, so that the disaster recovery end device determines whether the fingerprints of the added data blocks already exist in the disaster recovery end device; and a receiving module configured to receive duplicate check information that is sent by the disaster recovery end device, where the duplicate check information includes a fingerprint that is of a first data block in the added data blocks and that is different from fingerprints of data blocks in the first snapshot, where the sending module is further configured to send, according to the duplicate check information, the first data block indicated by the duplicate check information and metadata of the added data blocks to the disaster recovery end device.

With reference to the fourth aspect, in a first possible implementation manner of the fourth aspect, the obtaining module is configured to obtain the fingerprints of the added data blocks using a hardware accelerator card.

According to a fifth aspect, an embodiment of the present disclosure provides a primary end device applied to a remote replication system, where the system includes the primary end device and a disaster recovery end device, and both the primary end device and the disaster recovery end device store a first snapshot; and the primary end device includes a processor and a memory, where the processor and the memory communicate with each other using a bus, and the processor executes a computer instruction in the memory to perform any method in the first aspect.

According to a sixth aspect, an embodiment of the present disclosure provides a primary end device applied to a remote replication system, where the system includes the primary end device and a disaster recovery end device, and both the primary end device and the disaster recovery end device store a first snapshot; and the primary end device includes a processor and a memory, where the processor and the memory communicate with each other using a bus, and the processor executes a computer instruction in the memory to perform any method in the second aspect.

According to the de-duplication-based remote replication method and the apparatus in the embodiments of the present disclosure, a primary end device obtains a second snapshot of the primary end device; the primary end device determines whether fingerprints of data blocks added in the second snapshot compared with a first snapshot are the same as fingerprints of data blocks in the first snapshot; and the first data block, the fingerprint of the first data block, and metadata of the added data blocks are sent to a disaster recovery end device when a fingerprint of a first data block in the added data blocks is different from the fingerprints of the data blocks in the first snapshot, where both the primary end device and the disaster recovery end device store the first snapshot. This implements de-duplication-based remote replication, and during replication, no fingerprint needs to be sent to the disaster recovery end device for querying. Therefore, fingerprint query operations and network interaction are reduced, that is, consumption of network bandwidth is reduced. This improves performance of disaster recovery backup of remote replication, and resolves a prior-art problem that a fingerprint query operation is extremely complex, and network interaction is increased because of a fingerprint query process, and consequently much network bandwidth is occupied.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure.

Figure 1:
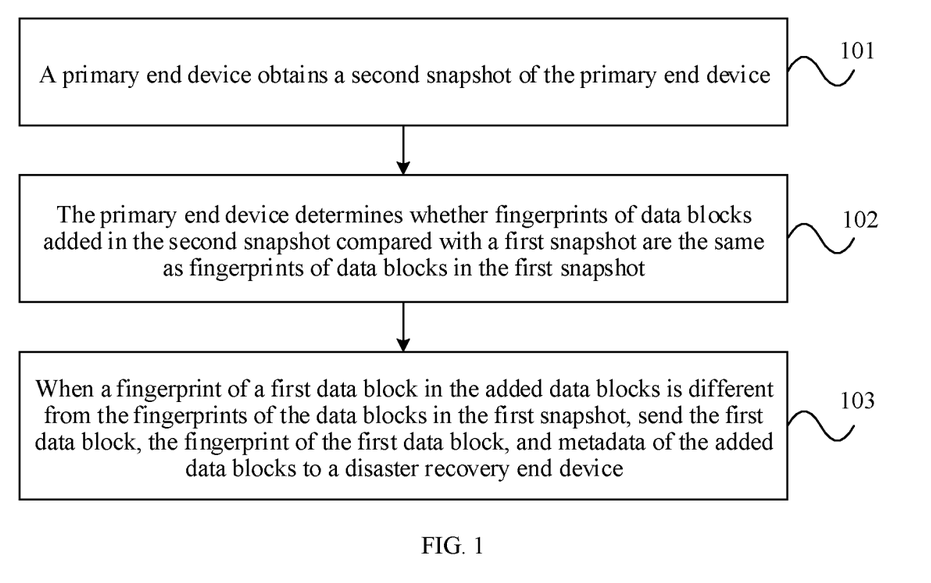
FIG. 1 is a flowchart of Embodiment 1 of a de-duplication-based remote replication method according to the present disclosure.
Figure 2:
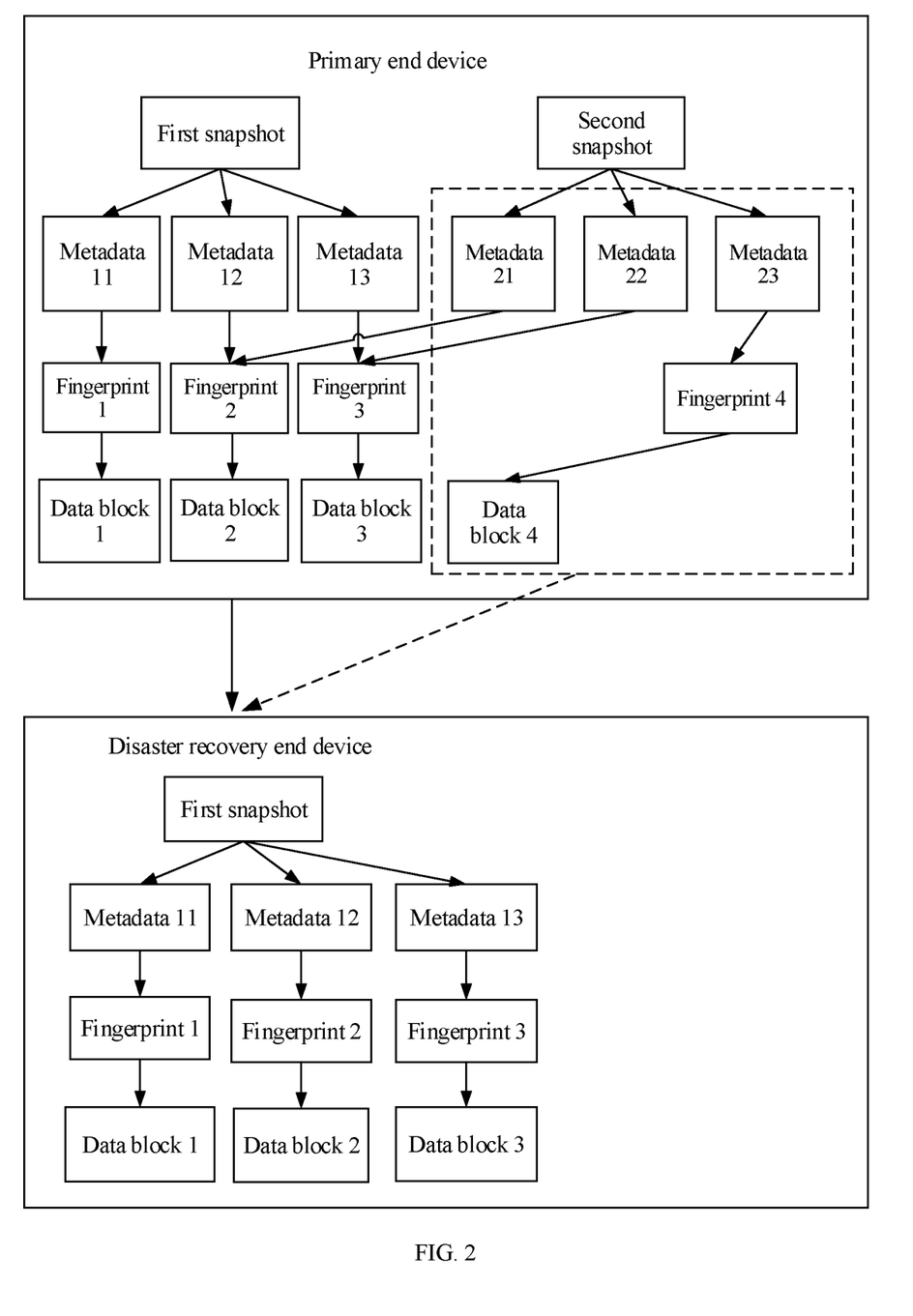
FIG. 2 is a schematic diagram of remote data replication according to a method embodiment of the present disclosure.

FIG. 1 is a flowchart of Embodiment 1 of a de-duplication-based remote replication method according to the present disclosure. FIG. 2 is a schematic diagram of remote data replication according to a method embodiment of the present disclosure. The method in this embodiment may be applied to a remote replication system. The system includes a primary end device and a disaster recovery end device, and this embodiment may be performed by the primary end device. As shown in FIG. 1, in the method in this embodiment, both the primary end device and the disaster recovery end device store a first snapshot, and the method includes the following steps.

Step 101: The primary end device obtains a second snapshot of the primary end device.

Step 102: The primary end device determines whether fingerprints of data blocks added in the second snapshot compared with the first snapshot are the same as fingerprints of data blocks in the first snapshot.

Step 103: When a fingerprint of a first data block in the added data blocks is different from the fingerprints of the data blocks in the first snapshot, send the first data block, the fingerprint of the first data block, and metadata of the added data blocks to the disaster recovery end device.

The primary end device first needs to create a second snapshot of to-be-replicated data, and then obtains a first snapshot of replicated data. Both the primary end device and the disaster recovery end device store the first snapshot, and the replicated data is last-replicated data. Further, whether fingerprints of data blocks added in the second snapshot compared with the first snapshot are the same as fingerprints of data blocks in the first snapshot needs to be determined. The first snapshot and the second snapshot herein may have multiple fingerprints each. When a fingerprint of a data block in the data blocks added in the second snapshot compared with the first snapshot is different from the fingerprints of the data blocks in the first snapshot, the data block is a first data block, and the first data block, the fingerprint of the first data block, and metadata of the added data blocks are sent to the disaster recovery end device. The metadata includes fingerprint indexes of the data blocks, that is, description information such as locations in the data blocks, storage locations of the data blocks, sizes of the data blocks, and identifiers of the data blocks.

As shown in FIG. 2, the first snapshot has been replicated to the disaster recovery end device. When a fingerprint of a data block added in the second snapshot, that is, a fingerprint 4 in the second snapshot, is different from the fingerprints of the data blocks in the first snapshot, a data block 4 corresponding to the fingerprint 4, metadata 23 and the fingerprint 4 of the data block 4, metadata 21 of a data block 2 corresponding to a fingerprint 2 in the second snapshot, and metadata 22 of a data block 3 corresponding to a fingerprint 3 in the second snapshot, that is, data in a dashed-line box in FIG. 2, are sent to the disaster recovery end device. After receiving the data, the disaster recovery end device writes the data, and creates a snapshot after replication is completed.

Optionally, the method in this embodiment further includes, when the fingerprint of the first data block in the added data blocks is the same as the fingerprints of the data blocks in the first snapshot, skipping replicating the first data block to the disaster recovery end device.

When the fingerprints of all the data blocks added in the second snapshot are the same as the fingerprints of the data blocks in the first snapshot, the first data block is not replicated to the disaster recovery end device.

In this embodiment, a primary end device obtains a second snapshot of the primary end device; the primary end device determines whether fingerprints of data blocks added in the second snapshot compared with a first snapshot are the same as fingerprints of data blocks in the first snapshot; and when a fingerprint of a first data block in the added data blocks is different from the fingerprints of the data blocks in the first snapshot, the first data block, the fingerprint of the first data block, and metadata of the added data blocks are sent to a disaster recovery end device, where both the primary end device and the disaster recovery end device store the first snapshot. This implements de-duplication-based remote replication, and during replication, no fingerprint needs to be sent to the disaster recovery end device for querying. Therefore, fingerprint query operations and network interaction are reduced, that is, consumption of network bandwidth is reduced. This improves performance of disaster recovery backup of remote replication, and resolves a prior-art problem that a fingerprint query operation is extremely complex, and network interaction is increased because of a fingerprint query process, and consequently much network bandwidth is occupied.

Figure 3:
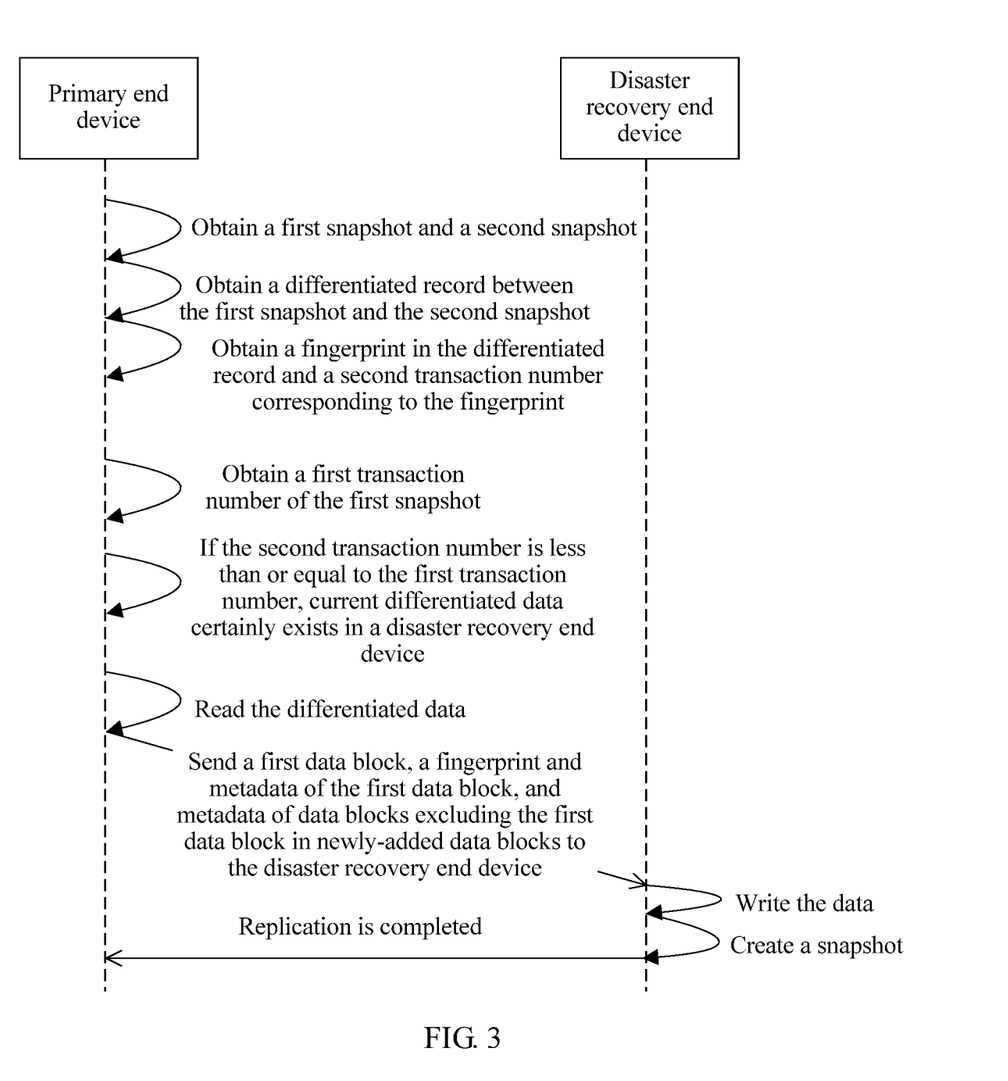
FIG. 3 is a flowchart of Embodiment 2 of a de-duplication-based remote replication method according to the present disclosure.

FIG. 3 is a flowchart of Embodiment 2 of a de-duplication-based remote replication method according to the present disclosure. As shown in FIG. 3, in the method in this embodiment, the determining, by the primary end device, whether fingerprints of data blocks added in the second snapshot compared with the first snapshot are the same as fingerprints of data blocks in the first snapshot includes obtaining, by the primary end device, a first transaction number of the first snapshot and a second transaction number of a fingerprint of each data block in the added data blocks; and determining whether the second transaction number is greater than the first transaction number, where when a second transaction number of the fingerprint of the first data block is greater than the first transaction number, the fingerprint of the first data block is different from the fingerprints of the data blocks in the first snapshot, and fingerprints of data blocks excluding the first data block in the added data blocks are the same as the fingerprints of the data blocks in the first snapshot.

Optionally, the determining, by the primary end device, whether fingerprints of data blocks added in the second snapshot compared with the first snapshot are the same as fingerprints of data blocks in the first snapshot includes obtaining, by the primary end device, a differentiated record, where the differentiated record is used to record the added data blocks; and determining, by the primary end device, whether the fingerprints of the added data blocks that are recorded in the differentiated record are the same as the fingerprints of the data blocks in the first snapshot.

During initial replication, the primary end device needs to create a snapshot, and replicate data of the snapshot of the primary end device to the disaster recovery end device. After the replication is completed, the disaster recovery end device also creates a snapshot. After the replication is completed, snapshot data of the disaster recovery end device is the same as snapshot data of the primary end device, and data replicated each time later is differentiated data between a currently replicated snapshot and a last-replicated snapshot.

Therefore, when currently replicated data already exists in the last-replicated snapshot, the currently replicated data certainly exists in the disaster recovery end device.

After de-duplication is enabled on the primary end device and the disaster recovery end device, when a fingerprint of to-be-replicated data exists in the last-replicated snapshot, the fingerprint of the data certainly exists in the disaster recovery end device.

As shown in FIG. 2 and FIG. 3, the second snapshot of the to-be-replicated data first needs to be created, and then the first snapshot of the replicated data is obtained, where the replicated data is the last-replicated data. The differentiated record between the second snapshot and the first snapshot is obtained, and the differentiated record is used to record the added data blocks. As shown in FIG. 2, the differentiated record is the metadata 21, the metadata 22, and the metadata 23. The fingerprints of the data blocks that are recorded in the differentiated record are obtained, and the fingerprints are the fingerprint 2, the fingerprint 3, and the fingerprint 4. Whether the fingerprints of the data blocks that are recorded in the differentiated record are the same as the fingerprints of the data blocks in the first snapshot is determined, that is, whether the fingerprint 2, the fingerprint 3, and the fingerprint 4 are the same as the fingerprints of the data blocks in the first snapshot is determined. In this embodiment, whether the fingerprints of the data blocks that are recorded in the differentiated record are the same as the fingerprints of the data blocks in the first snapshot may be determined in a transaction number manner, and a specific process is as follows.

The first transaction number of the first snapshot and the second transaction number of the fingerprint of each data block in the added data blocks are obtained; the first snapshot is corresponding to a first transaction number, and a fingerprint of each data block in the first snapshot is also corresponding to a transaction number, and the transaction number corresponding to the fingerprint may be equal to the first transaction number; and the fingerprint of each data block in the data blocks added in the second snapshot is corresponding to a second transaction number. It is assumed that the first transaction number corresponding to the first snapshot is 1, transaction numbers corresponding to a fingerprint 1, a fingerprint 2, and a fingerprint 3 that are in the first snapshot are also 1; and that a second transaction number corresponding to the fingerprint 2 in the second snapshot is 1, a second transaction number corresponding to the fingerprint 3 in the second snapshot is 1, and a second transaction number corresponding to the fingerprint 4 in the second snapshot is 2. In this case, the second transaction numbers of the fingerprint 2 and the fingerprint 3 that are in the second snapshot are equal to the first transaction number of the first snapshot, and therefore the fingerprint 2 and the fingerprint 3 that are in the second snapshot are the same as the fingerprint 2 and the fingerprint 3 that are in the first snapshot, and the data block 2 and the data block 3 respectively corresponding to the fingerprint 2 and the fingerprint 3 that are in the second snapshot do not need to be transmitted to the disaster recovery end device. The second transaction number of the fingerprint 4 in the second snapshot is greater than the first transaction number corresponding to the first snapshot, and therefore the fingerprint 4 in the second snapshot is different from all the fingerprints in the first snapshot. Therefore, a first data block corresponding to the fingerprint 4, the metadata 23 of the first data block, and the fingerprint 4 need to be transmitted to the disaster recovery end device, and the metadata 21 and the metadata 22 respectively corresponding to the data block 2 and the data block 3 also need to be transmitted to the disaster recovery end device.

A transaction is a program execution unit that accesses data and that may update the data. A transaction is usually generated in execution of a user program written in a high-level programming language (such as structured query language (SQL), C++, or Java), and is defined using a statement (or a function call) in a form of a begin transaction and an end transaction. The transaction includes all operations executed between the begin transaction and the end transaction. Each transaction is corresponding to a number, that is, a transaction number. A transaction has four attributes: atomicity, consistency, isolation, and durability.

Figure 4:
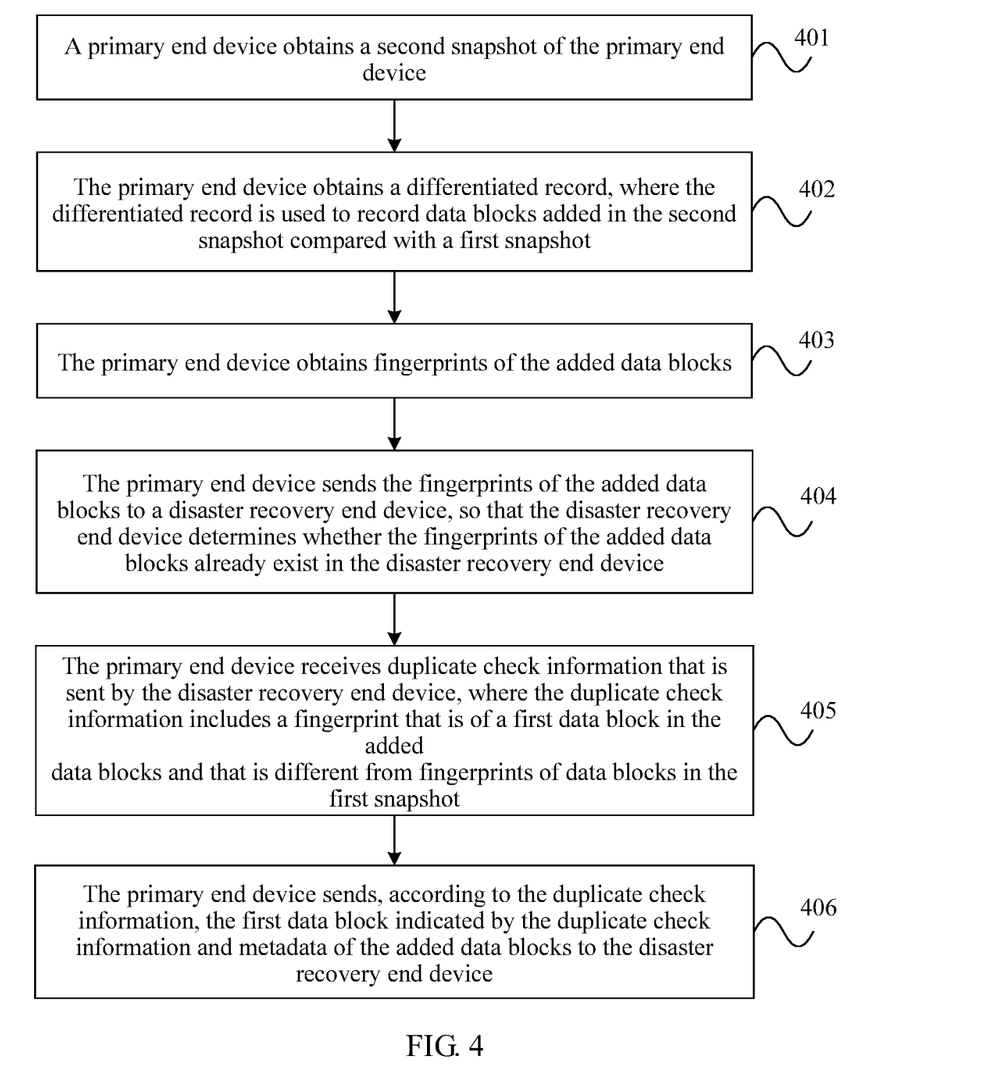
FIG. 4 is a flowchart 1 of Embodiment 3 of a de-duplication-based remote replication method according to the present disclosure.
Figure 5:
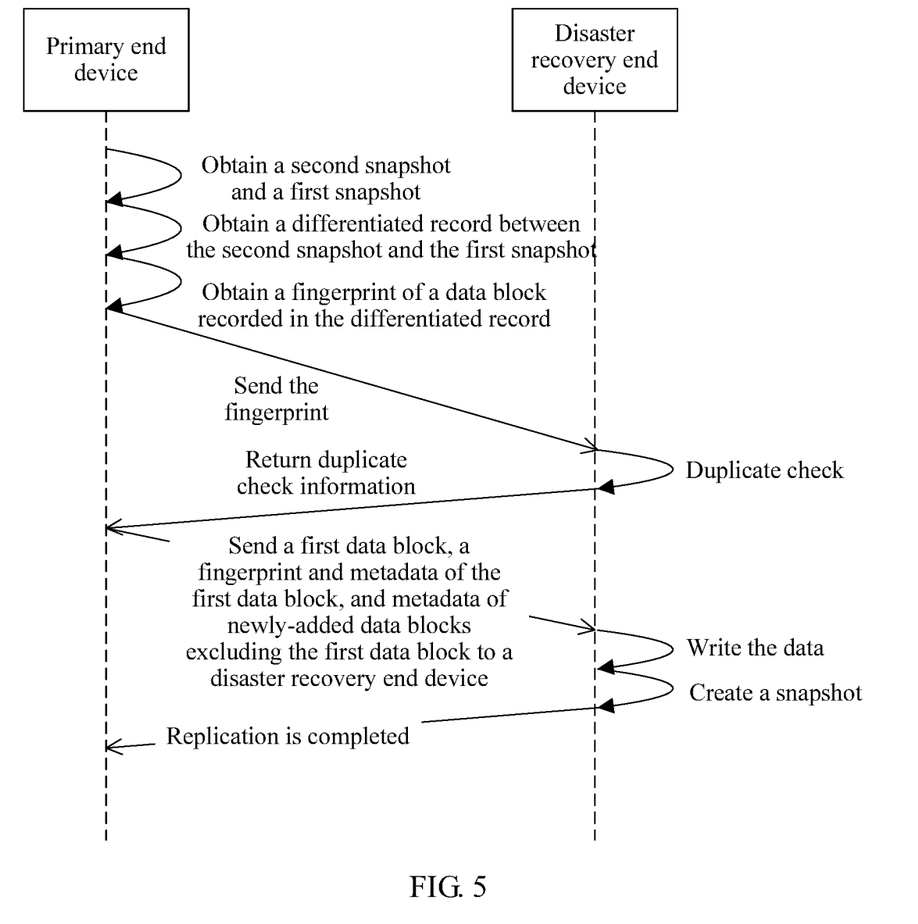
FIG. 5 is a flowchart 2 of Embodiment 3 of a de-duplication-based remote replication method according to the present disclosure.

FIG. 4 is a flowchart 1 of Embodiment 3 of a de-duplication-based remote replication method according to the present disclosure, and FIG. 5 is a flowchart 2 of Embodiment 3 of the de-duplication-based remote replication method according to the present disclosure. The method in this embodiment is applied to a remote replication system. The system includes a primary end device and a disaster recovery end device, and an execution body may be the primary end device. As shown in FIG. 4 and FIG. 5, in the method in this embodiment, both the primary end device and the disaster recovery end device store a first snapshot, and the method includes the following steps.

Step 401: The primary end device obtains a second snapshot of the primary end device.

Step 402: The primary end device obtains a differentiated record, where the differentiated record is used to record data blocks added in the second snapshot compared with the first snapshot.

Step 403: The primary end device obtains fingerprints of the added data blocks.

Step 404: The primary end device sends the fingerprints of the added data blocks to the disaster recovery end device, so that the disaster recovery end device determines whether the fingerprints of the added data blocks already exist in the disaster recovery end device.

Step 405: The primary end device receives duplicate check information that is sent by the disaster recovery end device, where the duplicate check information includes a fingerprint that is of a first data block in the added data blocks and that is different from fingerprints of data blocks in the first snapshot.

Step 406: The primary end device sends, according to the duplicate check information, the first data block indicated by the duplicate check information and metadata of the added data blocks to the disaster recovery end device.

The primary end device first needs to create a second snapshot of to-be-replicated data, and then obtains a first snapshot of replicated data. Both the primary end device and the disaster recovery end device store the first snapshot, and the replicated data is last-replicated data. A differentiated record between the second snapshot and the first snapshot is obtained, where the differentiated record is used to record data blocks added in the second snapshot compared with the first snapshot. As shown in FIG. 2, the differentiated record is metadata 21, metadata 22, and metadata 23. Fingerprints of the data blocks that are recorded in the differentiated record are obtained, and the fingerprints are a fingerprint 2, a fingerprint 3, and a fingerprint 4. The fingerprints are sent to the disaster recovery end device, and the disaster recovery end device performs duplicate check on the fingerprints that are sent by the primary end device. When the fingerprints exist in the disaster recovery end device, it is considered that these data blocks that are recorded in the differentiated record exist in the disaster recovery end device; when the fingerprints do not exist in the disaster recovery end device, these data blocks that are recorded in the differentiated record do not exist in the disaster recovery end device, and the primary end device needs to send the data blocks that are recorded in the differentiated record to the disaster recovery end device. The disaster recovery end device sends duplicate check information to the primary end device, where the duplicate check information includes a fingerprint that is of a first data block in the added data blocks and that is different from fingerprints of data blocks in the first snapshot, that is, a fingerprint 4. After receiving the duplicate check information, the primary end device sends the first data block indicated by the duplicate check information and metadata of the added data blocks to the disaster recovery end device. That is, a data block 4 corresponding to the fingerprint 4 is sent to the disaster recovery end device, and the sent data further includes the metadata 23 of the data block 4, the fingerprint 4, and the metadata 21 and the metadata 22 that are corresponding to other fingerprints. After receiving the data, the disaster recovery end device writes the data, and creates a snapshot after replication is completed.

Optionally, the obtaining, by the primary end device, fingerprints of the added data blocks includes obtaining, by the primary end device, the fingerprints of the added data blocks using a hardware accelerator card.

In a main memory of the primary end device, because a main service imposes a requirement on a central processing unit (CPU) delay, there is a strong possibility that the main service does not have a de-duplication function, or the de-duplication function is manually/automatically disabled. Therefore, in the solution of this embodiment, de-duplication-based remote replication may be implemented by a method of calculating a fingerprint at a primary end using a hardware accelerator card.

In this embodiment, a primary end device obtains a second snapshot of the primary end device; the primary end device obtains a differentiated record, where the differentiated record is used to record data blocks added in the second snapshot compared with a first snapshot; the primary end device obtains fingerprints of the added data blocks; the primary end device sends the fingerprints of the added data blocks to a disaster recovery end device, so that the disaster recovery end device determines whether the fingerprints of the added data blocks already exist in the disaster recovery end device; the primary end device receives duplicate check information that is sent by the disaster recovery end device, where the duplicate check information includes a fingerprint that is of a first data block in the added data blocks and that is different from fingerprints of data blocks in the first snapshot; and the primary end device sends, according to the duplicate check information, the first data block indicated by the duplicate check information and metadata of the added data blocks to the disaster recovery end device. This implements de-duplication-based remote replication when a primary end does not have a de-duplication function. The primary end calculates a fingerprint using a hardware accelerator card, sends the fingerprint to the disaster recovery end device for duplicate check, and sends a newly-added data block to the disaster recovery end device according to a fingerprint of the newly-added data block indicated by the duplicate check information. This improves performance of disaster recovery backup of remote replication.

Figure 6:
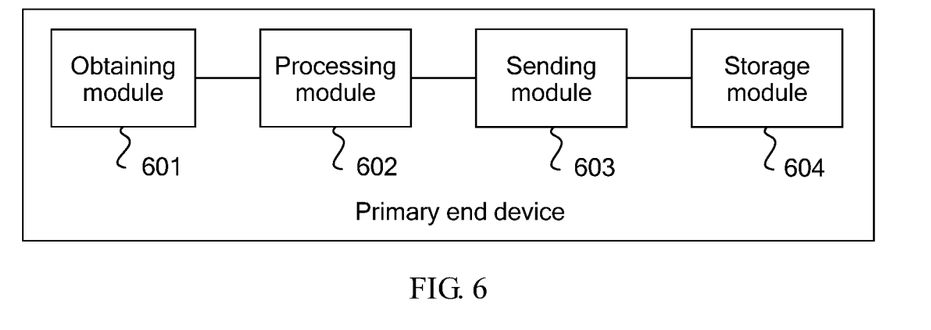
FIG. 6 is a schematic structural diagram of Embodiment 1 of a primary end device according to the present disclosure.

FIG. 6 is a schematic structural diagram of Embodiment 1 of a primary end device according to the present disclosure. As shown in FIG. 6, the primary end device in this embodiment includes an obtaining module 601, a processing module 602, a sending module 603, and a storage module 604.

The storage module 604 is configured to store a first snapshot, where the first snapshot is also stored in a disaster recovery end device.

The obtaining module 601 is configured to obtain a second snapshot of the primary end device.

The processing module 602 is configured to determine whether fingerprints of data blocks added in the second snapshot compared with the first snapshot are the same as fingerprints of data blocks in the first snapshot.

The sending module 603 is configured to, when a fingerprint of a first data block in the added data blocks is different from the fingerprints of the data blocks in the first snapshot, send the first data block, the fingerprint of the first data block, and metadata of the added data blocks to the disaster recovery end device.

Optionally, the processing module 602 is configured to obtain a first transaction number of the first snapshot and a second transaction number of a fingerprint of each data block in the added data blocks; and determine whether the second transaction number is greater than the first transaction number, where when a second transaction number of the fingerprint of the first data block is greater than the first transaction number, the fingerprint of the first data block is different from the fingerprints of the data blocks in the first snapshot, and fingerprints of data blocks excluding the first data block in the added data blocks are the same as the fingerprints of the data blocks in the first snapshot.

Optionally, the obtaining module 601 is configured to obtain a differentiated record, where the differentiated record is used to record the added data blocks.

The processing module 602 is configured to determine whether the fingerprints of the added data blocks that are recorded in the differentiated record are the same as the fingerprints of the data blocks in the first snapshot.

Optionally, the processing module 602 is further configured to, when the fingerprint of the first data block in the added data blocks is the same as the fingerprints of the data blocks in the first snapshot, skip replicating the first data block to the disaster recovery end device.

The primary end device in this embodiment may be configured to execute the technical solution of the method embodiment shown in FIG. 1. Implementation principles and technical effects thereof are similar, and details are not described herein.

Figure 7:
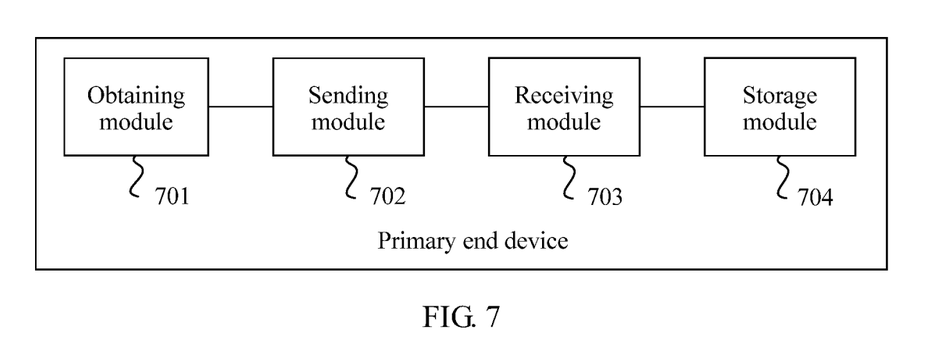
FIG. 7 is a schematic structural diagram of Embodiment 2 of a primary end device according to the present disclosure.

FIG. 7 is a schematic structural diagram of Embodiment 2 of a primary end device according to the present disclosure. As shown in FIG. 7, the primary end device in this embodiment includes an obtaining module 701, a sending module 702, a receiving module 703, and a storage module 704.

The storage module 704 is configured to store a first snapshot, where the first snapshot is also stored in a disaster recovery end device. The obtaining module 701 is configured to obtain a second snapshot of the primary end device.

The obtaining module 701 is further configured to obtain a differentiated record, where the differentiated record is used to record data blocks added in the second snapshot compared with the first snapshot. The obtaining module 701 is further configured to obtain fingerprints of the added data blocks.

The sending module 702 is configured to send the fingerprints of the added data blocks to the disaster recovery end device, so that the disaster recovery end device determines whether the fingerprints of the added data blocks already exist in the disaster recovery end device.

The receiving module 703 is configured to receive duplicate check information that is sent by the disaster recovery end device, where the duplicate check information includes a fingerprint that is of a first data block in the added data blocks and that is different from fingerprints of data blocks in the first snapshot.

The sending module 702 is further configured to send, according to the duplicate check information, the first data block indicated by the duplicate check information and metadata of the added data blocks to the disaster recovery end device.

Optionally, the obtaining module 701 is configured to obtain the fingerprints of the added data blocks using a hardware accelerator card.

The primary end device in this embodiment may be configured to execute the technical solution of the method embodiment shown in FIG. 4. Implementation principles and technical effects thereof are similar, and details are not described herein.

Figure 8:
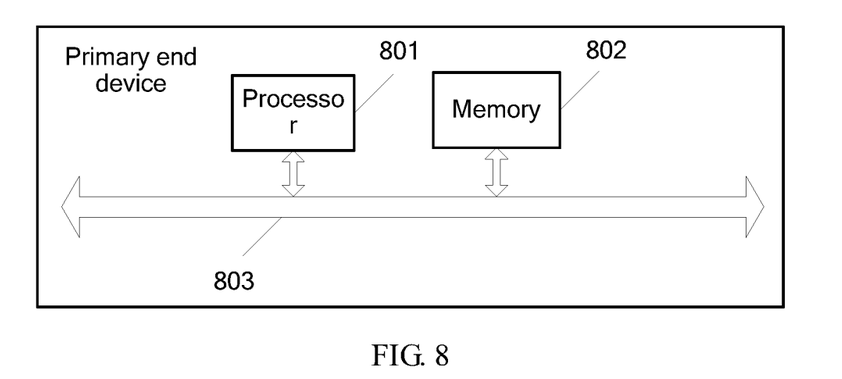
FIG. 8 is a schematic structural diagram of Embodiment 3 of a primary end device according to the present disclosure.

FIG. 8 is a schematic structural diagram of Embodiment 3 of a primary end device according to the present disclosure. As shown in FIG. 8, the primary end device in this embodiment is applied to a remote replication system. The system includes the primary end device and a disaster recovery end device, and both the primary end device and the disaster recovery end device store a first snapshot. The primary end device includes a processor 801 and a memory 802, where the processor 801 and the memory 802 communicate with each other using a bus 803, and the processor 801 executes a computer instruction in the memory 802 to perform any method in the method embodiment shown in FIG. 1.

In Embodiment 4 of a primary end device according to the present disclosure, the primary end device in this embodiment may use the schematic structural diagram shown in FIG. 8, and is applied to a remote replication system. The system includes the primary end device and a disaster recovery end device, and both the primary end device and the disaster recovery end device store a first snapshot. The primary end device includes a processor and a memory, where the processor and the memory communicate with each other using a bus, and the processor executes a computer instruction in the memory to perform the method in the method embodiment shown in FIG. 4.

In the several embodiments provided in the present application, it should be understood that the disclosed device and method may be implemented in other manners. For example, the described device embodiment is merely an example. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

What is claimed is:

1. A method implemented by a primary end device in a remote replication system, the method comprising:
obtaining a second snapshot of the primary end device;
determining, without sending a fingerprint to a disaster recovery end device of the remote replication system, whether second fingerprints of second data blocks added in the second snapshot compared with a first snapshot are the same as first fingerprints of first data blocks in the first snapshot, wherein the first snapshot is stored in the primary end device and the disaster recovery end device, and wherein the second fingerprints comprise a selected fingerprint of a selected data block in the second data blocks;
obtaining a first transactions number of the first snapshot;
obtaining a second transaction number of the second fingerprints;
making a determination whether the second transaction number is greater than the first transaction number;

determining whether the select fingerprint is different from the first fingerprints based on the determination; and sending, to the disaster recovery end device, the selected data block, the selected fingerprint, and metadata of the second data blocks when the selected fingerprint is different from the first fingerprints.

2. The method of claim 1, further comprising obtaining a differentiated record.

3. The method of claim 2, wherein the differentiated record records the second data blocks.

4. The method of claim 3, further comprising determining whether the second fingerprints are the same as the first fingerprints.

5. The method of claim 1, further comprising determining that the selected fingerprint is different from the first fingerprints when the second transaction number is greater than the first transaction number.

6. The method of claim 5, further comprising determining that the selected fingerprint is not different from the first fingerprints when the second transaction number is not greater than the first transaction number.

7. The method of claim 1, wherein the metadata comprise a storage location of the selected data block.

8. The method of claim 7, wherein the metadata further comprise a size of the selected data block.

9. The method of claim 8, wherein the metadata further comprise an identifier of the selected data block.

10. A method implemented by a primary end device in a remote replication system, the method comprising:
obtaining a second snapshot of the primary end device;
obtaining a differentiated record recording second data blocks added in the second snapshot compared with a first snapshot, wherein the first snapshot is stored in the primary end device and a disaster recovery end device of the remote replication system;
obtaining second fingerprints of the second data blocks;
sending, to the disaster recovery end device, the second fingerprints to prompt the disaster recovery end device to determine whether the second fingerprints already exist in the disaster recovery end device;
receiving, from the disaster recovery end device, duplicate check information comprising a selected fingerprint of a selected data block in the second data blocks, wherein the selected fingerprint is different from first fingerprints of first data blocks in the first snapshot; and
sending, to the disaster recovery end device in response to the duplicate check information, the selected data block.

11. The method of claim 10, further comprising further obtaining the second fingerprints using a hardware accelerator card.

12. A primary end device in a remote replication system and comprising:
a memory configured to store a first snapshot comprising first fingerprints of first data blocks; and
a processor coupled to the memory and configured to:
obtain a second snapshot of the primary end device;
determine, without sending a fingerprint to a disaster recovery end device of the remote replication system, whether second fingerprints of second data blocks added in the second snapshot compared with the first snapshot are the same as the first fingerprints, wherein the first snapshot is stored in the disaster recovery end device, and wherein the second fingerprints comprise a selected fingerprint of a selected data block in the second data blocks;
obtaining a first transactions number of the first snapshot;
obtaining a second transaction number of the second fingerprints;
making a determination whether the second transaction number is greater than the first transaction number;
determining whether the select fingerprint is different from the first fingerprints based on the determination; and
send, to the disaster recovery end device, the selected data block, the selected fingerprint, and metadata of the second data blocks when the selected fingerprint is different from the first fingerprints.

13. The primary end device of claim 12, wherein the processor is further configured to obtain a differentiated record recording the second data blocks.

14. The primary end device of claim 13, wherein the processor is further configured to determine whether the second fingerprints are the same as the first fingerprints.

15. The primary end device of claim 12, wherein the processor is further configured to determine that the selected fingerprint is different from the first fingerprints when the second transaction number is greater than the first transaction number.

16. The primary end device of claim 15, wherein the processor is further configured to determine that the selected fingerprint is not different from the first fingerprints when the second transaction number is not greater than the first transaction number.

17. The primary end device of claim 12, wherein the metadata comprise a storage location of the selected data block.

18. The primary end device of claim 17, wherein the metadata further comprise a size of the selected data block.

19. The primary end device of claim 18, wherein the metadata further comprise an identifier of the selected data block.

20. A primary end device in a remote replication system and comprising:
a memory configured to store instructions; and
a processor coupled to the memory and configured to execute the instructions to:
obtain a second snapshot of the primary end device;
obtain a differentiated record recording second data blocks added in the second snapshot compared with a first snapshot, wherein the first snapshot is stored in the primary end device and a disaster recovery end device of the remote replication system;
obtain second fingerprints of the second data blocks;
send, to the disaster recovery end device, the second fingerprints to prompt the disaster recovery end device to determine whether the second fingerprints already exist in the disaster recovery end device;
receive, from the disaster recovery end device, duplicate check information comprising a selected fingerprint of a selected data block in the second data blocks, wherein the selected fingerprint is different from first fingerprints of first data blocks in the first snapshot; and
send, to the disaster recovery end device in response to the duplicate check information, the selected data block.

* * * * *

UNITED STATES PATENT AND TRADEMARK OFFICE
CERTIFICATE OF CORRECTION

PATENT NO. : 10,860,539 B2
APPLICATION NO. : 15/486536
DATED : December 8, 2020
INVENTOR(S) : Yanhui Zhong and Chengwei Zhang It is certified that error appears in the above-identified patent and that said Letters Patent is hereby corrected as shown below:

In the Claims

Claim 12, Column 14, Line 3: "obtaining a first" should read "obtain a first"

Claim 12, Column 14, Line 5: "obtaining a second" should read "obtain a second"

Claim 12, Column 14, Line 7: "making a determination" should read "make a determination"

Claim 12, Column 14, Line 9: "determining whether the select" should read "determine whether the select"

Signed and Sealed this
Nineteenth Day of January, 2021

Andrei Iancu
*Director of the United States Patent and Trademark Office*